United States Patent [19]

Wagner

[11] 4,186,779
[45] Feb. 5, 1980

[54] CORRUGATED METAL TUBE

[75] Inventor: William T. Wagner, Dayton, Ohio

[73] Assignee: Dayco Corporation, Dayton, Ohio

[21] Appl. No.: 905,487

[22] Filed: May 12, 1978

[51] Int. Cl.² .............................................. H02G 3/04
[52] U.S. Cl. .................................... 138/121; 138/171; 138/177
[58] Field of Search ................. 138/121, 122, 171, 177

[56] References Cited

U.S. PATENT DOCUMENTS

| 365,466 | 6/1887 | Fox .......................................... 138/171 |
| 3,710,828 | 1/1973 | Ziemek et al. ........................ 138/171 |

Primary Examiner—Houston S. Bell
Attorney, Agent, or Firm—Charles E. Bricker

[57] ABSTRACT

A corrugated metal tube are provided wherein such tube has a central longitudinal axis and comprises a single-thickness member having integral corrugations and opposed edges and the member is in tubular form with the corrugations defining substantially annular alternating radially outwardly facing projections and channels with the opposed edges being disposed immediately adjacent each other and each of the edges extending along a mean path substantially parallel to the axis with a weld fixing the edges together.

1 Claim, 10 Drawing Figures

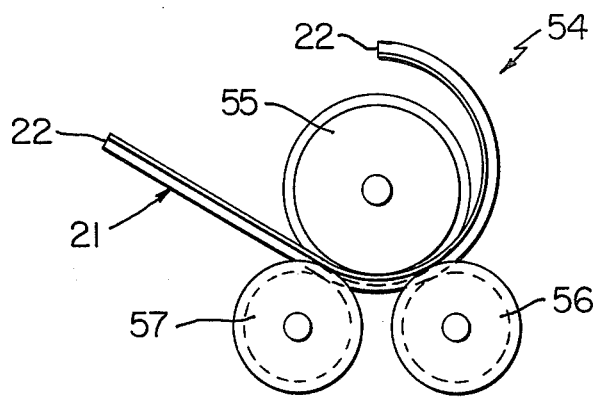
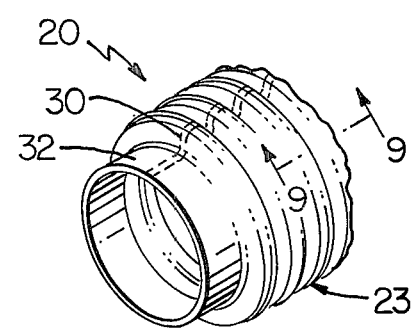
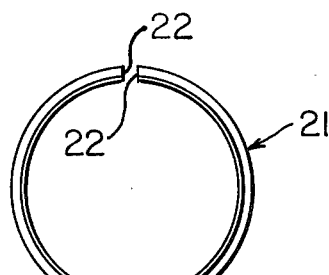
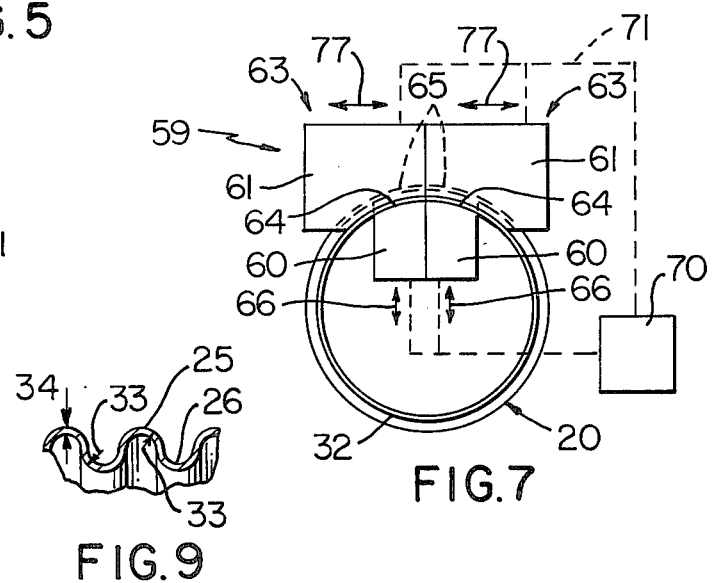
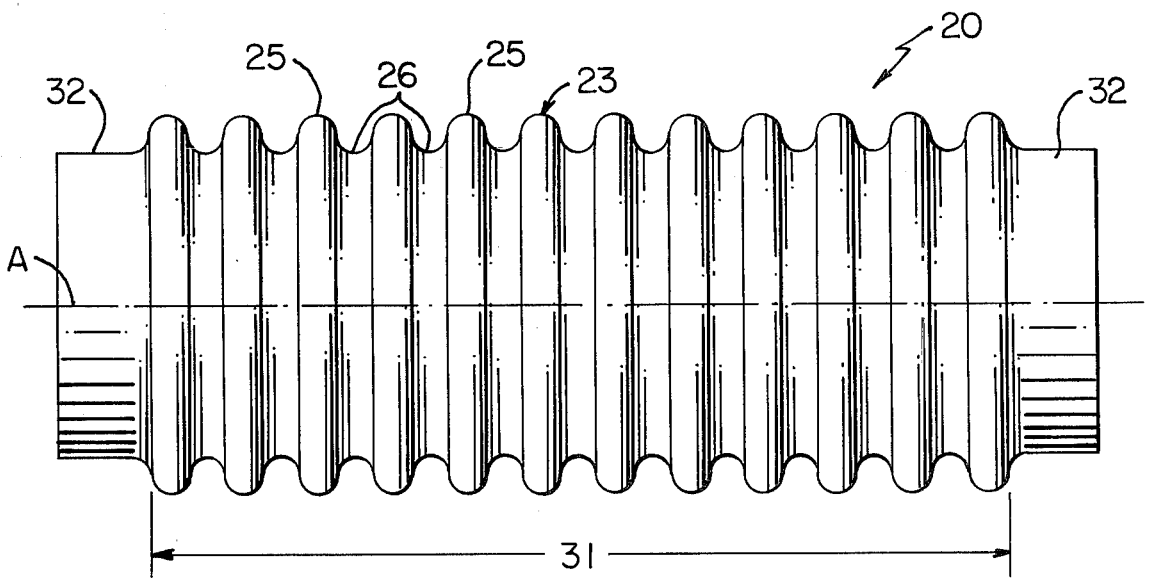

CORRUGATED METAL TUBE

BACKGROUND OF THE INVENTION

Corrugated metal conduits or tubes are widely used in industry and typical applications include those applications where it is desired to provide a conduit for high temperature fluids which is capable of accommodating differential expansion and contraction of the conduit relative to supporting structure, where it is desired to provide a fluid conduit having maximum hoop strength, applications where the conduit must extend in a curved path and/or with its opposite ends misaligned, and applications where the additional surface provided by the corrugations is useable as a heat exchanger between fluid flowing through the conduit and the medium surrounding such conduit. In many of the above applications the corrugated conduits or tubes employed are of comparatively short lengths ranging between several inches and several feet and basically it is comparatively expensive to produce corrugated metal tubes in such short lengths.

SUMMARY

It is a feature of this invention to provide a corrugated metal tube which is of simple and economical construction.

Another feature of this invention is to provide a corrugated metal tube made of a single-thickness member.

Another feature of this invention is to provide a metal tube of the character mentioned which is of high structural strength yet has flexibility and provides a substantial exposed surface area due to the corrugations thereof.

Another feature of this invention is to provide a corrugated metal tube of the character mentioned which is particularly adapted to be used in the exhaust system of an automobile.

Another feature of this invention is to provide a corrugated metal tube having a central longitudinal axis and comprising a single thickness member having integral corrugations and opposed edges with the member being in tubular form and the corrugations defining substantially annular alternating radially outwardly facing projections and channels and with the opposed edges being disposed immediately adjacent each other, each of the edges extending along a mean path substantially parallel to the axis, and a weld fixing the edges together.

Another feature of this invention is to provide an improved method of making a corrugated metal tube of the character mentioned.

Therefore, it is an object of this invention to provide an improved corrugated metal tube having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 5 is an end view illustrating an apparatus and method employed in forming the sheet of FIG. 4 to define a tubular form;

FIG. 6 is a view illustrating the sheet after forming thereof to define a formed tube having edges aligned in opposed relation;

FIG. 7 is an end view illustrating apparatus and method employed in welding the initially free edges of the formed tube to define a completed corrugated metal tube;

FIG. 8 is a perspective view of a forward portion of the completed tube particularly showing the weld therein;

FIG. 9 is a fragmentary cross-sectional view taken essentially on the line 9—9 of FIG. 8; and FIG. 10 is a view in elevation of the completed corrugated metal tube of this invention.

DESCRIPTION OF ILLUSTRATED EMBODIMENTS

Figure 4:
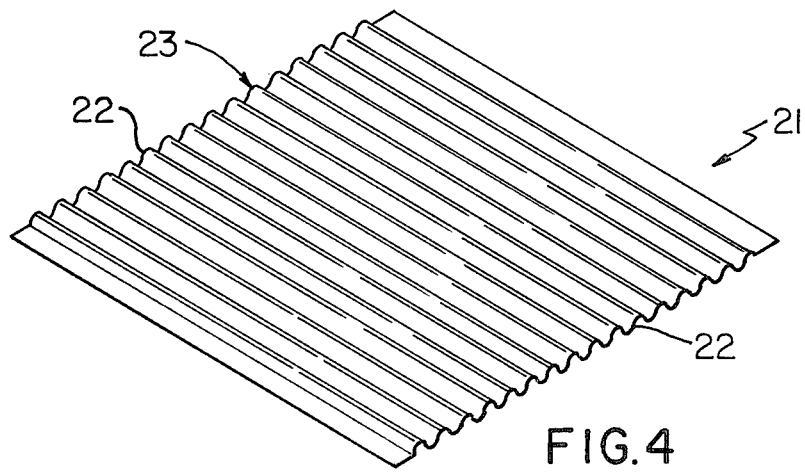
FIG. 4 is a perspective view of a typical predetermined length sheet of corrugated metallic material which has been cut as shown in FIG. 1 and such sheet is adapted to be used to define the corrugated metal tube of this invention.

Reference is now made to FIGS. 8, 9, and 10 of the drawings which illustrate one exemplary embodiment of a corrugated metal tube of this invention which is designated generally by the reference numeral 20; and, the metal tube is made employing the method of this invention whereby such tube is made with optimum economy. Depending upon its application the tube 20 may be made of comparatively thin metallic material for optimum flexibility or such tube may be made of comparatively thicker material where high hoop strength is desired. The tube 20 is made from a single-thickness metal member shown as a sheet 21 which is illustrated in FIG. 4 and such sheet has opposed edges 22. The sheet 21 is formed to define tube 20 and such forming will be described in detail subsequently.

The tube 20 thus formed has a central longitudinal axis A and has integral corrugations shown at 23 with the corrugations defining substantially annular alternating radially outwardly facing projections 25 and channels 26 such that the opposed edges 22 extend along a mean path which is disposed substantially parallel to the longitudinal axis A. The tube 20 has a weld 30 (FIG. 8) fixing the edges 22 together and the weld is defined of the metallic material which defines the metal tube.

The tube 20 has a central portion 31 which defines the major part of the axial length of such tube and the central portion 31 has the integral corrugations 23 defined therein. The tube 20 also has a pair of right circular cylindrical portions each designated by the same reference numeral 32; and, portions 32 extend from opposite ends of the central portion 31. As best shown in FIGS. 8 and 10 the diameter of the right circular cylindrical portions have a diameter which is substantially equal to the diameter of the channels 26. The central portion 31 and right circular cylindrical portions 32 define the tube 20 as a single-piece metal structure.

As best seen in FIG. 9 of the drawings the projections 25 and channels 26 are of substantially semicircular cross-sectional outline with the cross sectional outline of the projections and channels being of substantially the same radius 33. Further, the weld 30 is a butt weld defined as an integral part of the tube and is made of the metallic material comprising such tube whereby the tube 20 has optimum structural strength.

The tube 20 is of substantially uniform thickness throughout and such uniform thickness is designated by the reference numeral 34. Accordingly, the corrugated central portion 31, the right circular cylindrical end portions 32, and the weld 30 have substantially the same thickness.

The tube 20 is preferably made in accordance with the method of this invention which is shown in FIGS. 1 through 7 of the drawings. In particular, reference is first made to FIG. 1 of the drawings which illustrates a length or web of a suitable metallic material 35 wound in coil form to define a supply roll 36 thereof. The supply roll 36 is suitably supported for unwinding rotation and the material is moved through two corrugating stations shown as a first station 40 and a second station 41 where the material is corrugated as will now be described.

Figure 1:
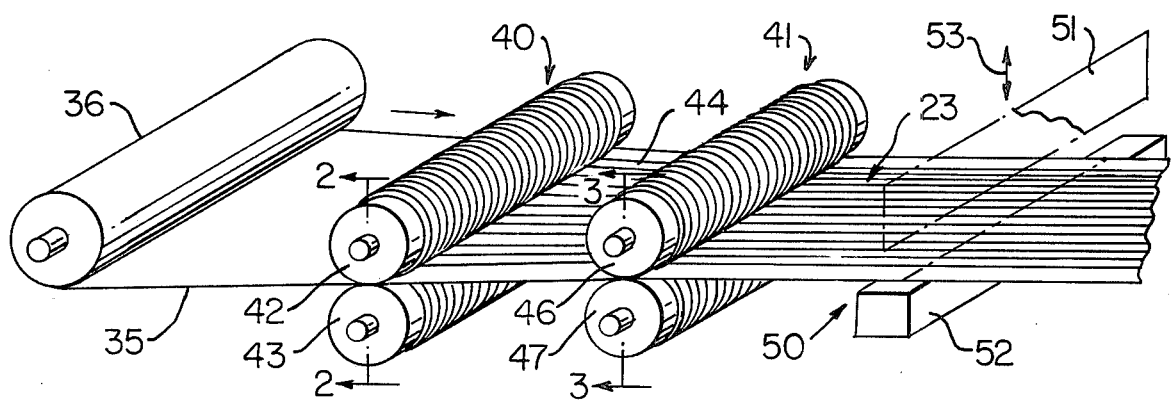
FIG. 1 is a perspective view with parts in elevation, parts broken away, and parts shown schematically illustrating an apparatus and method steps wherein integral corrugations are defined in a web of metallic material and the corrugated web cut into sheets of predetermined length.
Figure 2:
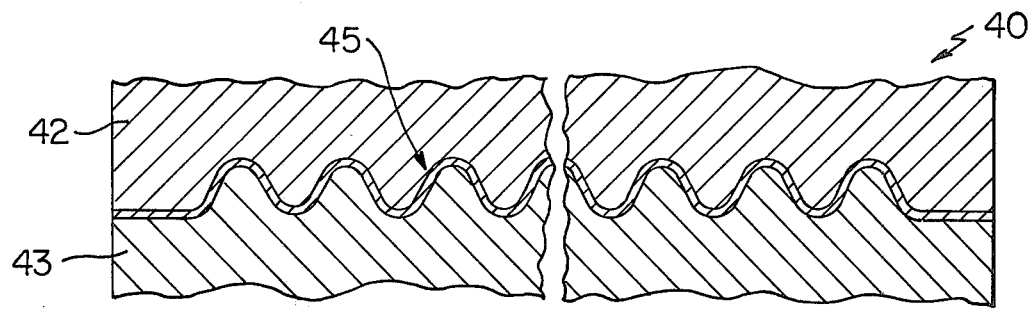
FIG. 2 is a fragmentary cross-sectional view with the center portion broken away taken essentially on the line 2—2 of FIG. 1.
Figure 3:
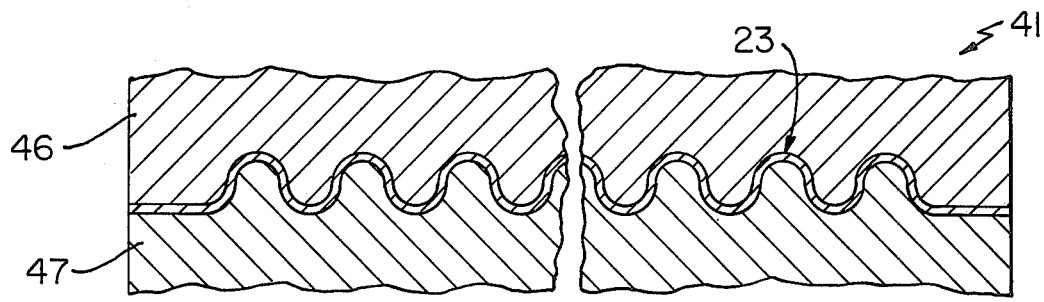
FIG. 3 is a view similar to FIG. 2 taken essentially on the line 3—3 of FIG. 1.

At station 40, a pair of cooperating corrugating rollers 42 and 43, engage and compress the material 35 therebetween to provide a partially corrugated material 44 having a corrugated form as shown at 45 in FIG. 2. The partially corrugated material 44 is then moved to the second corrugating station 41 where a pair of cooperating corrugating rollers 46 and 47 form the partially corrugated sheet material 44 to define the final corrugations 23 therein as shown in FIGS. 3 and 4. The corrugated web of metallic material is then moved to a cutting station 50 as shown in FIG. 1 where it is cut as will now be described.

At the cutting station 50, a cutting blade 51 is provided and cooperates with a backup block or anvil 52 to cut the corrugated web into sheets 21. An actuating mechanism for the cutting blade 51 is provided and such mechanism is designated by the reference numeral 53. The actuating mechanism is indicated schematically by a double arrow 53 and serves to move the cutting blade 51 toward and away from the anvil 52 to provide each sheet 21 which is of predetermined length as measured parallel to the longitudinal axes of the corrugations and such length determines the circumference of the tube 20. It will also be appreciated that cutting knife 51 and anvil 52 may have suitable configurations defined therein so that the cutting action may be achieved while maintaining the corrugations 23 intact, i.e., not flattened, adjacent the cut line where the knife 51 engages the metallic material.

In carrying out the various steps shown in FIG. 1 suitable support means, moving means, and control means are provided as required to enable a substantially continuous processing of metallic material in an indexing manner comprising unwinding of metallic material from the supply roll 36, partial forming of corrugations in such material to define partially corrugated material 44, final forming of the material to define corrugations 23 and cutting the corrugated material to define sheets.

In forming the corrugated tube 20 of this invention the overall axial length of the tube is defined by the width of web after finally forming the desired shape of the corrugations therein; and, the circumference of the tube is defined by the length, along the corrugations, of the sheet defined by cutting at station 50, as previously mentioned. In addition, the partial forming at station 40 is achieved in order to facilitate the final forming at station 41 and the forming at station 41 defines corrugations 23 such that in the final tube radially outwardly facing projections 25 and channels 26 are provided.

After cutting thereof the sheet 21 is formed employing a forming apparatus 54 as illustrated in FIG. 5. The apparatus 54 comprises a plurality of three forming rolls 55, 56, and 57 and the rolls have annular ribs and projections therein which correspond to the corrugations 23 in the sheet 21. Once the sheet 21 is moved through the forming apparatus 54 such sheet is basically in tubular form with the opposed edges 22 disposed in aligned relation (FIG. 6) and with such opposed edges having projections and channels in their central portions which define the central portion of the tube 20 and which are also disposed in aligned relation.

The tube 20 as shown in FIG. 6 is then welded to define a butt weld 30 therein as shown in FIG. 7 and a welding apparatus 59 is employed which comprises two sets of welding electrodes comprised of a substantially identical pair of inner electrodes 60 which are disposed within the tube 20 and a substantially identical pair of outer electrodes 61 disposed outside of such tube. The electrodes 60 and 61 have projections and channels therein which correspond to the projections 25 and channels 26 in the corrugated central portion 31 of the tube 20. In addition, the electrodes 61 and 62 have straight portions on opposite ends thereof which are particularly adapted to engage the cylindrical portions 32 to enable welding thereof.

Each set of electrodes 60 and 61 consists of an inner electrode 60 and an outer electrode 61 and for ease of description each set is designated by the reference numeral 63. The inner electrode 60 of each set 63 has a tube engaging surface 64 which is adapted to engage the inside surface of the tube while the outer electrode 61 of each set 63 has a tube engaging surface 65 which is adapted to engage the outside surface of the tube 20. Each set 63 of electrodes sandwiches an associated portion of the tube 20 therebetween with a portion (not shown) of the tube adjacent an associated edge 22 initially extending beyond a plane coinciding with the edges of the electrodes 60 and 61 of the set 63. The sets 63 serve as holding and aligning means for holding and aligning the edges 22 against each other. In addition, the electrodes serve, as is known in the art, to heat the metal adjacent the edges to enable welding of such edges. In addition, each set 63 is provided with actuating means 66 connected to its inner electrode 60 and actuating means 67 connected to its outer electrode 61 to enable the edges 22 to be urged and compressed together so that once the metal is heated to the required temperature the welding action is achieved.

The welding action provided by the apparatus 59 results in the butt weld 30 being defined which is a single-thickness which is substantially the same as the thickness of the tube material. The butt weld 30 extends in an undulating path which corresponds to the corrugations along the central corrugated portion 31 of the tube thus defined. In addition, the butt weld in the end portions 32 extends in a substantially rectangular path substantially parallel to the longitudinal axis A of tube 20.

The apparatus 59 is preferably in the form of an electrical resistance welding apparatus of any suitable type known in the art with the above described electrodes 60 and 61 comprising an integral part thereof. The remainder of such apparatus is indicated schematically by a rectangular block 70 and such electrodes 60 and 61 are connected to the remainder of such apparatus by suitable connections indicated by dotted lines and designated by a typical reference numeral 71.

The apparatus 59 is preferably employed to weld tubes 20 made of ferrous metal. However, it will be appreciated that the tubes 20 need not necessarily be made of ferrous metal whereby the method of this invention and welding apparatus may be suitably modified to enable forming tubes of nonferrous metal such as an aluminous metal, for example.

As previously indicated, the length of the tube 20 defined in accordance with this invention may vary from several inches to several feet. Further, the outside diameter of such tube is preferably greater than one inch with a typical outside diameter being 2½ inches while employing a metallic material having a thickness generally of the order of 0.020 inch to 0.030 inch.

While present exemplary embodiments of this invention and methods of practicing the same, have been illustrated and described, it will be recognized that this invention may be otherwise variously embodied and practiced within the scope of the following claims.

What is claimed is:

1. A corrugated ferrous metal tube having a central longitudinal axis and comprising, a single piece member having equal thickness throughout and consisting of a central portion and a pair of right circular cylindrical portions extending from the opposite ends of said central portion, said central portion having integral corrugations and opposed edges, said member being in tubular form with said corrugations defining substantially annular alternating radially outwardly facing projections and channels having a substantially semi-circular cross-sectional outline and each having the same average radius, said cylindrical portions having a diameter substantially equal to the diameter of said channels; said opposed edges disposed immediately adjacent each other, each of said edges disposed in abutting relation in an associated plane extending along a mean path substantially parallel to said axis, and a butt weld defined by fusing together the metal defining said opposed edges and fixing said edges together.

* * * * *